United States Patent
Avis et al.

Patent Number: 6,109,676
Date of Patent: Aug. 29, 2000

[54] BUMPER CORNER FOR A WHEEL LOADER ENGINE END FRAME

[75] Inventors: Scott D. Avis, Mapleton, Ill.; Jeffrey A. Deneve, Sanford, N.C.; Paul J. Staebler, Clayton, N.C.; Al C. Wingate, Sanford, N.C.

[73] Assignee: Caterpillar Inc., Peoria, Ill.

[21] Appl. No.: 08/961,926

[22] Filed: Oct. 31, 1997

[51] Int. Cl.[7] .................................................. B60R 19/04
[52] U.S. Cl. .......................... 293/149; 293/126; 293/151
[58] Field of Search ..................................... 293/102, 126, 293/132, 133, 149, 151, 152

[56] References Cited

U.S. PATENT DOCUMENTS

| | | | |
|---|---|---|---|
| Re. 17,254 | 4/1929 | Sohl | 293/126 |
| 2,672,363 | 3/1954 | Buchanan | 293/152 X |
| 4,783,104 | 11/1988 | Watanabe et al. | 293/102 |

FOREIGN PATENT DOCUMENTS

| | | | |
|---|---|---|---|
| 41413 | 12/1981 | European Pat. Off. | 293/152 |
| 0806525 | 11/1997 | European Pat. Off. | |
| 2702269 | 8/1977 | Germany | 293/126 |
| 3622483 | 1/1988 | Germany | 293/149 |
| 630046487 | 12/1994 | Japan . | |
| 100140613 | 5/1998 | Japan . | |

*Primary Examiner*—Joseph D. Pape
*Attorney, Agent, or Firm*—O. Gordon Pence

[57] ABSTRACT

An rear engine end frame for a compact wheel loader has an engine compartment with open corners behind the rear wheels of the loader. The open corners are closed by wraparound bumper corners made from relatively heavy metal castings that serve as counterweights as well as bumper corners. The bumper corners are detachably mounted to the engine compartment to permit ready access to the ends of the transversely mounted engine and to other components located in the rear corners of the engine compartment.

8 Claims, 4 Drawing Sheets

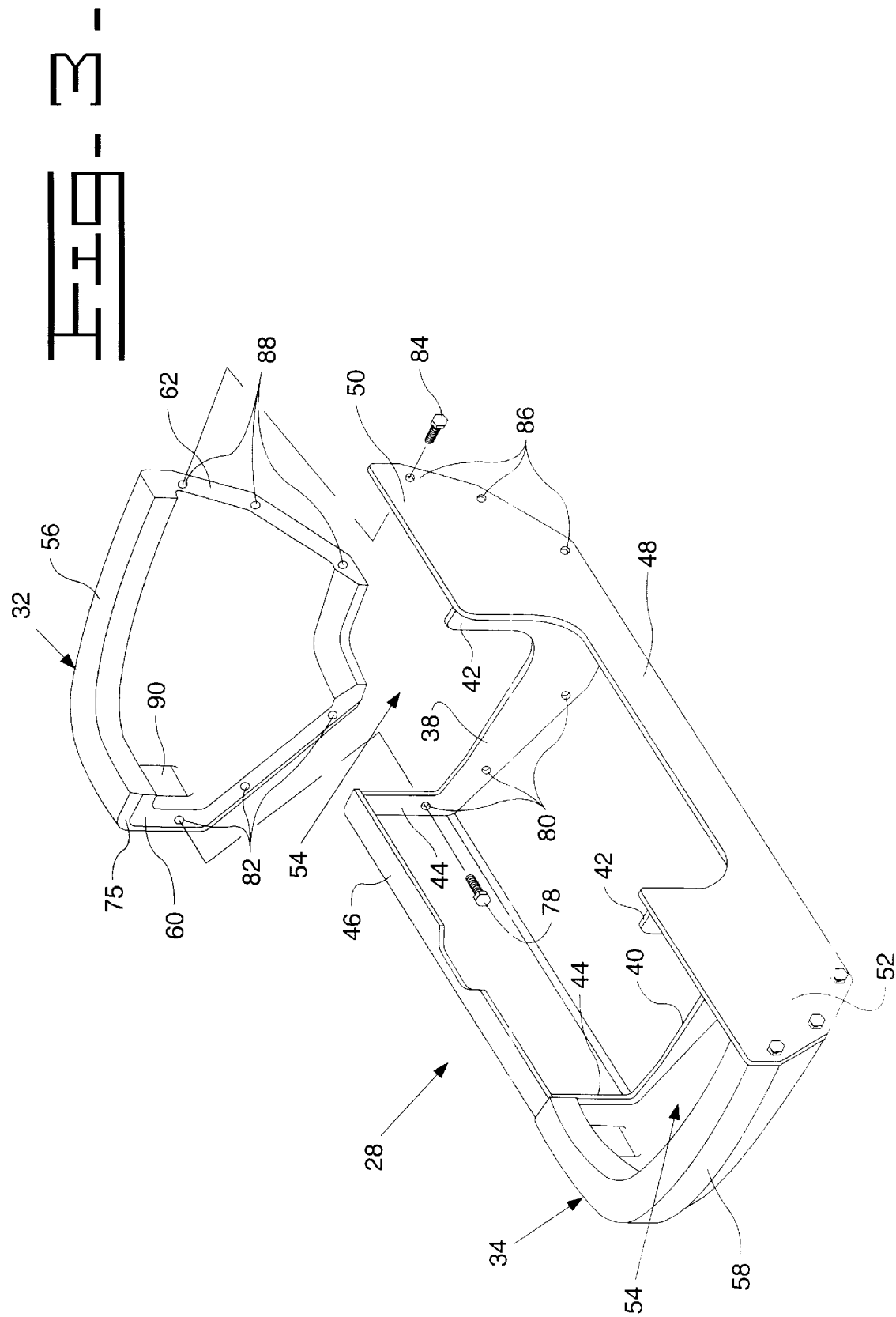

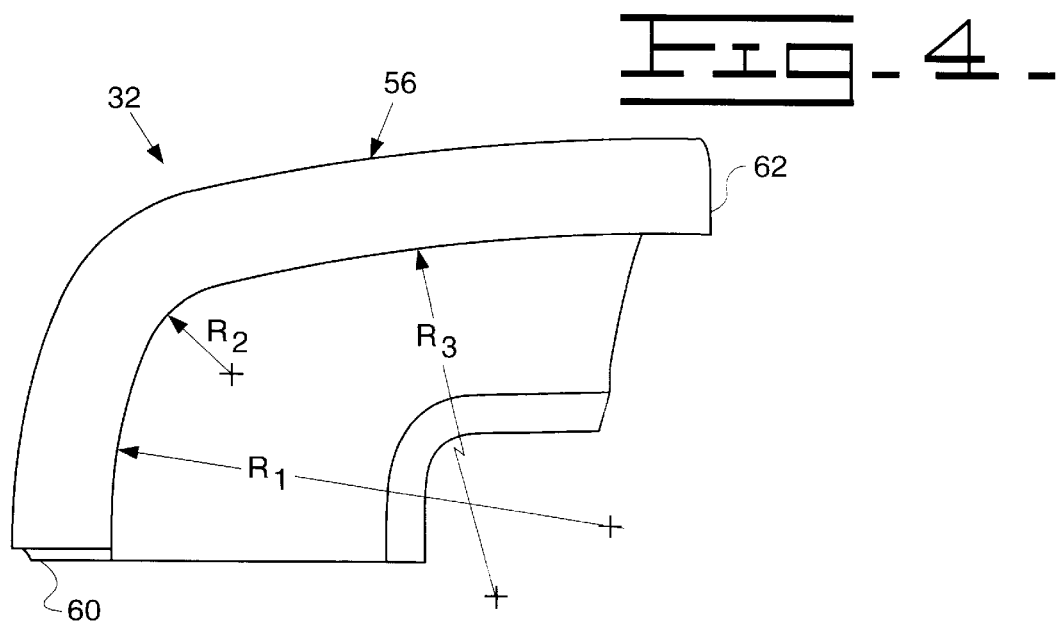
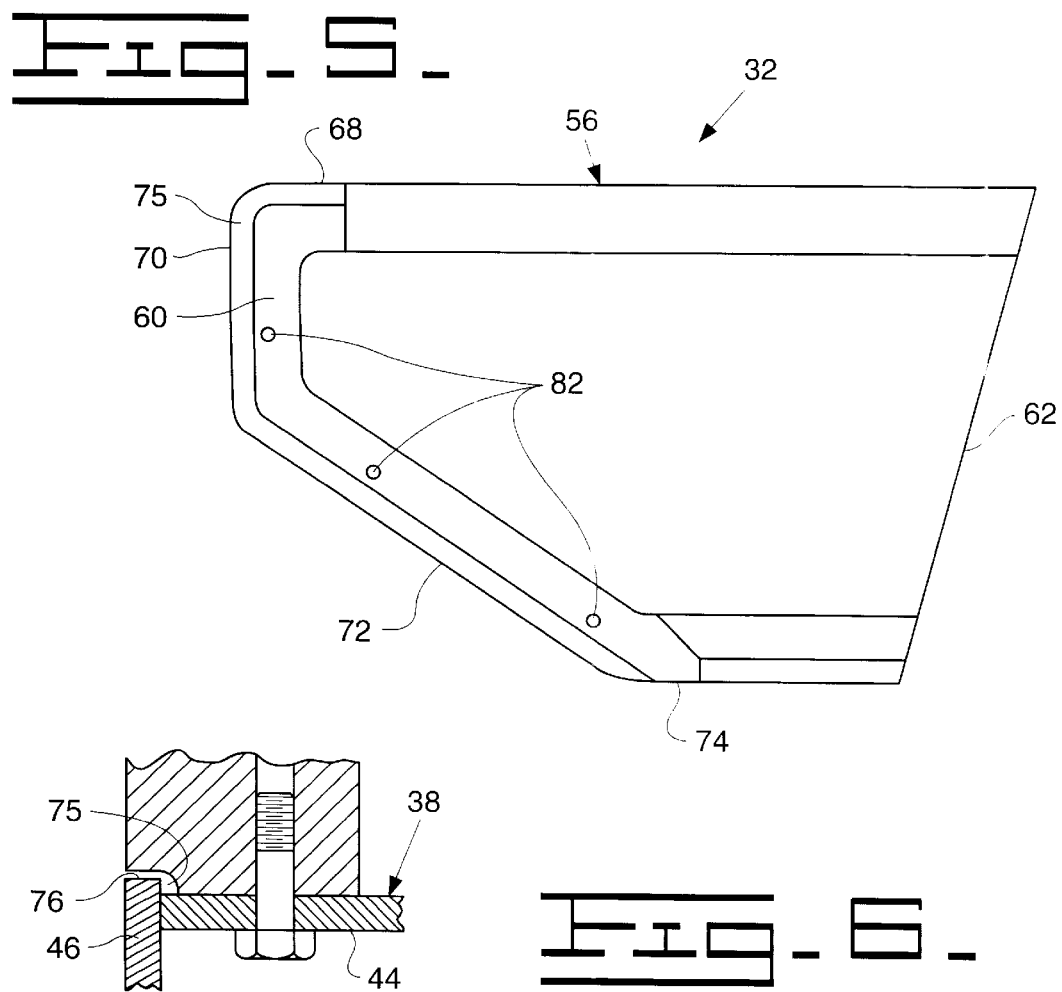

6,109,676

BUMPER CORNER FOR A WHEEL LOADER ENGINE END FRAME

TECHNICAL FIELD

The present invention relates generally to a wheel loader engine end frame and, more particularly, to a bumper corner for such engine end frame.

BACKGROUND ART

Articulated wheel loaders have long been used in the earthmoving and construction industries for excavating materials and loading such materials into trucks and the like. Most of the prior art wheel loaders have been large and expensive pieces of equipment, which are used by large contractors that typically operate large fleets of earthmoving equipment. Lately, however, there has been a trend toward much smaller, compact wheel loaders, which are typically used by small owner/operators that have only one or two pieces of earthmoving equipment. Such compact wheel loaders place a premium on space and on the number of components used in such equipment in order to keep the size of the loaders small and their price competitive.

Even though such compact wheel loaders are small, they must perform the same functions as their bigger counterparts. In particular, they must have a rear engine end frame that includes an engine compartment for an engine that propels and provides power to the loader. In addition, the engine end frame must accommodate the drive train and the rear wheels of the loader that support the rear frame. The rear frame must accommodate other components as well, including, for instance, the rear bumper and rear counterweights to provide the loader with the correct weight distribution when digging or lifting materials with the bucket or other tool and the linkage located on the front frame of the loader. Because of the limited space available for these and the many other components carried on the engine end frame of such compact wheel loaders, it is difficult to accommodate all of these necessary components and to provide sufficient access to those that require replacement or servicing in the cramped quarters provided.

Therefore, it is highly advantageous to provide components that serve dual functions and are removable to permit appropriate access to other components requiring service in the engine compartment.

The present invention is directed to overcoming one or more of the above problems encountered in the engine end of prior compact wheel loaders and the like.

DISCLOSURE OF THE INVENTION

In accordance with one aspect of the present invention, a bumper corner is provided for a rear engine end frame of a compact wheel loader. The bumper corner includes a rounded contoured heavy casing which is constructed of a cast metal of generally uniform thickness. The casing has an inward facing first end and a forward facing second end disposed outward and forward of the first end. The casing extends between the first and second ends and has an inwardly extending upper ledge portion, an upper side portion extending downwardly from the upper ledge portion, a lower side portion sloping inwardly from the upper side portion and a lower ledge portion extending inwardly from the lower side portion. Each of the portions extend laterally from the first end along a first curved path of a large radius then transition toward the front along a second curved path of a much smaller radius to a third curved path of another large radius to the second end.

In another aspect of the present invention, a bumper corner is provided for a rear engine end frame of an articulated compact wheel loader. The frame extends along a longitudinal axis from a rearward end to a forward end and is supported by a pair of laterally spaced wheels disposed on a respective one of opposite lateral sides of the frame. The bumper corner includes a heavy cast metal casing adapted to wraparound a rear corner of the engine end frame. The casing is of a generally uniform thickness and has a first end at the rearward end of the frame facing toward the longitudinal axis thereof and a second end along one of the lateral sides of the frame located behind and facing forward toward one of the wheels. The casing extends between the first and second ends and has an inwardly extending upper ledge portion, an upper side portion extending downwardly from the upper ledge portion, an angled lower side portion sloping inwardly from the upper side portion and a lower ledge portion extending inwardly from the lower side portion. Each of the portions extend laterally from the first end along a first curved path of a large radius then transition toward the forward end of the frame along a second curved path of a much smaller radius to a third curved path of another large radius to the second end.

In yet another aspect of the present invention, a rear engine end frame is provided for an articulated wheel loader. The end frame extends along a longitudinal axis and is supported by a pair of laterally spaced wheels disposed on a respective one of opposite lateral sides of the frame ahead of a rearward end of the frame. The rear engine end frame includes an engine compartment portion at the rearward end of the end frame behind the wheels. The engine compartment portion has a pair of laterally spaced, generally upright longitudinally extending frame members each having a forward end and a rearward end, a bumper member connected to and extending laterally between the rearward ends of the longitudinally extending frame members and a laterally extending frame member connected to and extending between the forward ends of each of the longitudinally extending frame members. The laterally extending frame member has a pair of forwardly sloping rear wheel well portions, each of which extends laterally outwardly behind a respective one of the pair of wheels at a position forward of the rearward end so as to define an open corner between each of the wheel well portions and a respective one of the longitudinally extending frame members. A pair of bumper corners are adapted to close a respective one of the open corners. Each of the bumper corners are constructed from a metal casting of sufficient thickness to provide each such corner bumper with a mass in excess of about 100 kilograms.

BRIEF DESCRIPTION OF THE DRAWINGS

FIG. 3 is a partially exploded perspective view showing an engine compartment portion of the engine end frame and the bumper corners shown in FIG. 2.

FIG. 4 is a top view of one of the bumper corners illustrated in FIG. 3;

FIG. 5 is an inside elevational view of the bumper corner illustrated in FIG. 4; and FIG. 6 is a fragmentary cross sectional view taken along line 6—6 of FIG. 2.

BEST MODE FOR CARRYING OUT THE INVENTION

Figure 1:
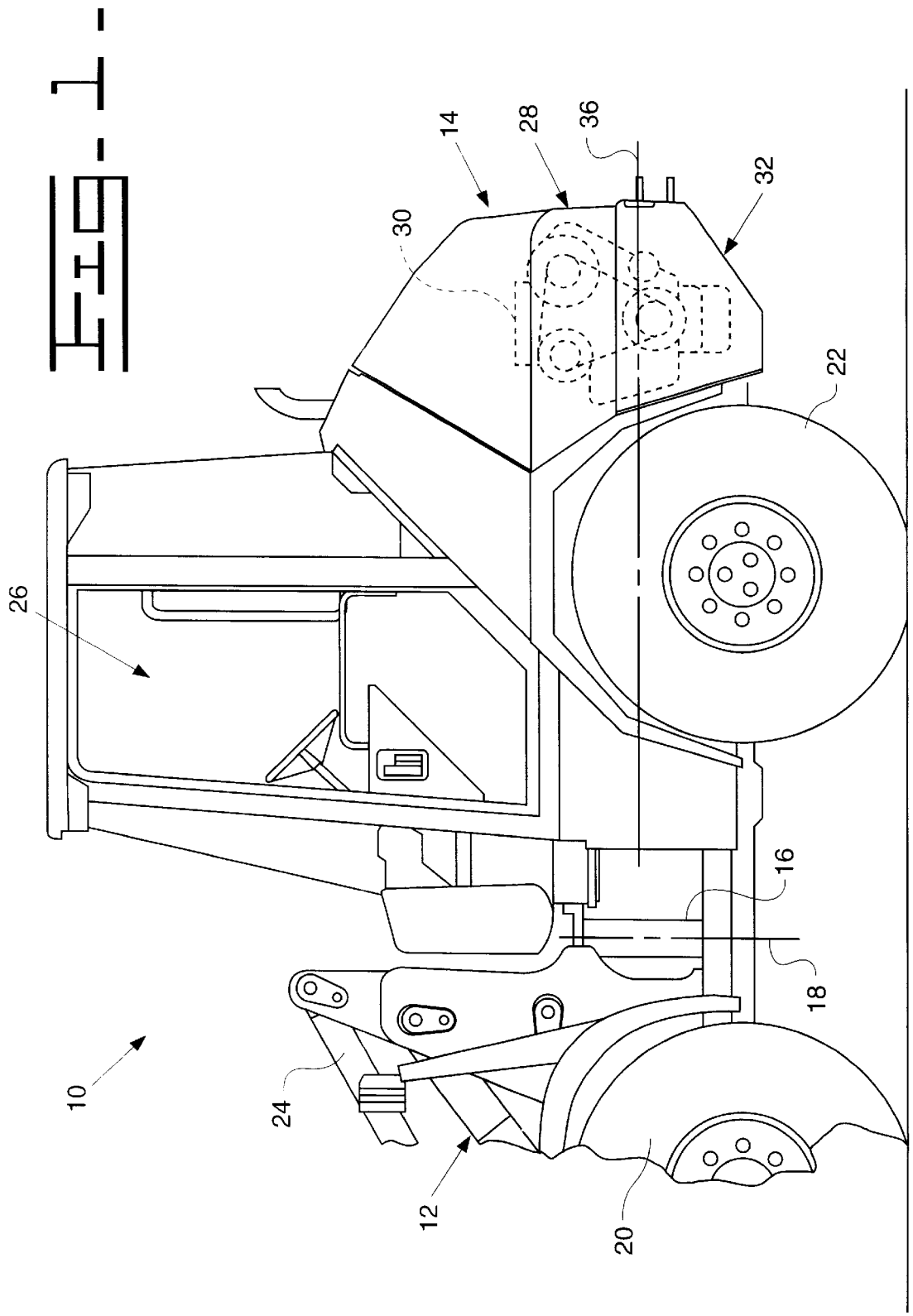
FIG. 1 is a fragmentary side elevational view of a compact wheel loader showing the rear engine end frame and one of the bumper corners embodying the principles of the present invention.
Figure 2:
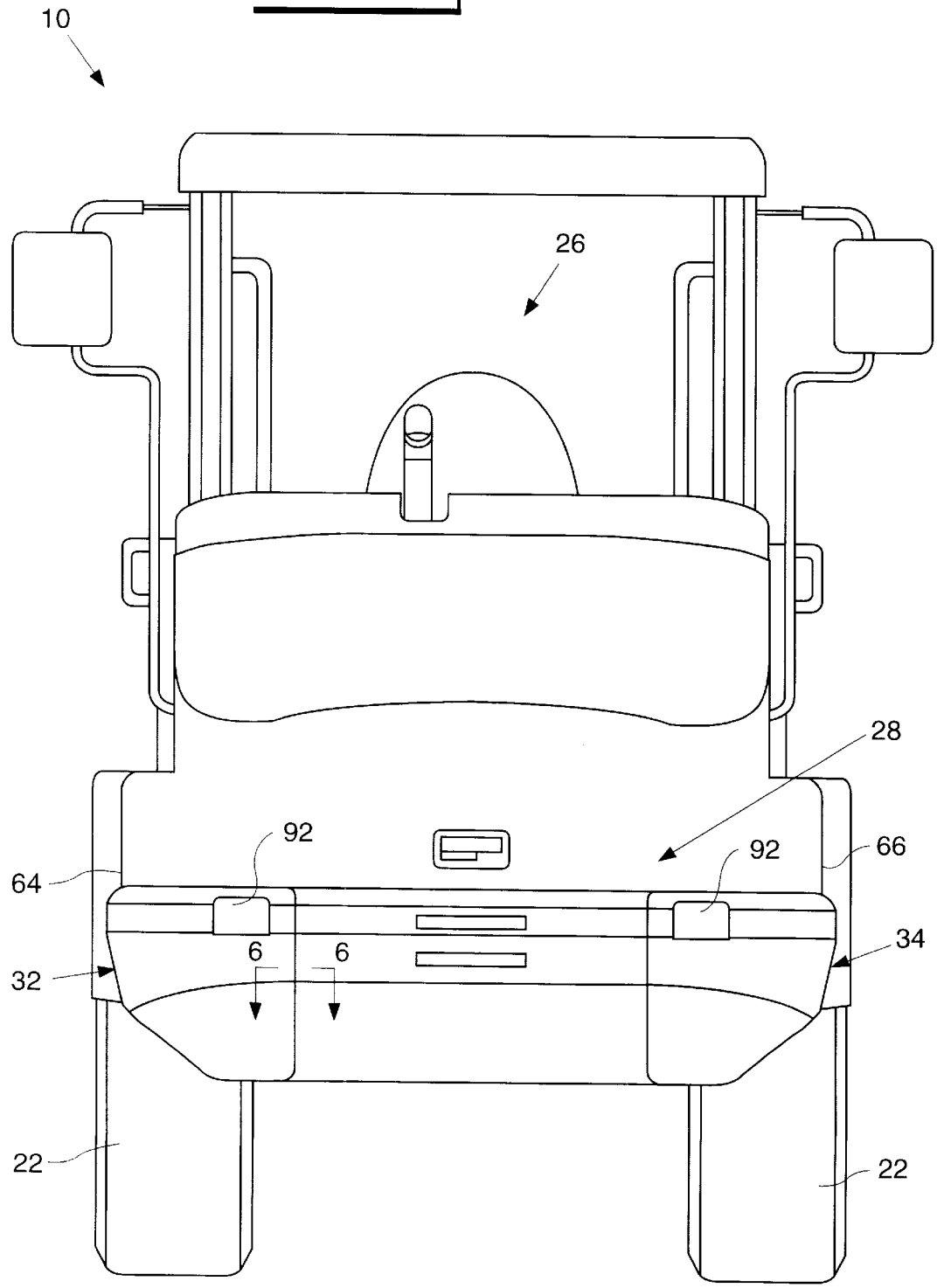
FIG. 2 is a rear elevational view of the engine end frame of the compact wheel loader illustrated in FIG. 1 and showing both of the rear bumper corners of the present invention.

Referring to the drawings and more particularly to FIG. 1, a compact articulated wheel loader 10 is shown having a front loader frame, partially shown at 12, and a rear engine end frame 14. The front and rear frames 12,14 are hinged together by an articulation joint 16 about a vertical pivot axis 18. The front frame is supported by a pair of front wheels, one shown at 20, while the rear frame is supported by a pair of rear wheels 22. As is customary, the front frame carries loader linkage 24, to which is mounted an implement, such as a bucket (not shown). The rear frame 14, on the other hand, carries an operators station 26 and includes an engine compartment portion 28, which carries an engine shown in dotted lines at 30 for propelling the loader and for powering the implements and other components on the loader, as is well known in the art. As will be more fully described below, the rear engine end frame also includes a pair of bumper corners 32,34 (FIG. 2).

The engine end frame extends along a longitudinal axis 36 and its engine compartment portion 28 includes a pair of laterally spaced, generally upright, longitudinally extending frame members 38,40 (FIG. 3), each having a forward end 42 and a rearward end 44. A bumper member 46 is connected in a suitable manner, preferably by welding, to and extends laterally between the rearward ends 44 of the longitudinally extending frame members 38,40. A laterally extending frame member 48 is connected in a suitable manner, preferably by welding, to and extends between the forward ends 42 of each of the longitudinally extending frame members 38,40. The laterally extending frame member 48 has a pair of forwardly sloping rear wheel well portions 50,52, each well portion extending laterally outwardly behind a respective one of the pair of rear wheels 22 at a position forward of the rearward end 44 of the longitudinally extending frame members 38,40 so as to define an open corner 54 between each of the wheel well portions 50,52 and a respective one of the longitudinally extending frame members 38,40.

In accordance with the present invention, each of the pair of bumper corners 32,34 are adapted to wraparound and close a respective one of the open corners 54. Each of the bumper corners 32,34 are constructed from a heavy cast metal casing 56,58, respectively. Such casing castings 56,58 are preferably made of gray iron, but may be made of any other suitable metal as well. Each casing 56,58 is constructed with a substantial, generally uniform wall thickness such that it has a substantial mass of about 100 kilograms or more. In particular, the wall thickness should be at least 30 mm or more. Casings 56,58 with a wall thickness of about 62 mm have a mass of about 200 kilograms. Casings 56,58 are provided with such a heavy weight so that they can function as counterweights, providing a combined weight of 400 kilograms or more, as well as bumper corners.

As such casings 56,58 are essentially mirror images of each other, only one of them, casing 56, will be described further in detail, it being understood that such description applies to the other casing 58 as well. Casing 56, then, includes a first end 60 disposed at the rearward end 44 of the rear frame 14 that faces toward the longitudinal axis 36 of the frame 14 and a second end 62 disposed along one of the lateral sides 64,66 (FIG. 2) of the frame 14 and located behind and facing forward toward one of the rear wheels 22. As best shown in FIG. 5, the casing 56 extends between the first and second ends 60,62 and includes an inwardly extending upper ledge portion 68, an upper side portion 70 extending downwardly from the upper ledge portion 68, an angled lower side portion 72 sloping inwardly from the upper side portion 70 and a lower ledge portion 74 extending inwardly from the lower side portion 72. Each of the portions 68,70, 72,74 extend laterally from the first end 60 along a first curved path of a large radius '$R_1$'. They then transition toward the forward end 42 of the frame 14 along a second curved path of a much smaller radius '$R_2$' to a third curved path of another large radius '$R_3$' to the second end 62.

The first end 60 of the casing 56 is constructed to mate up with the shape of rearward end 44 of its respective frame member 38 of the engine compartment 28 and may be provided with a peripheral chamfer or groove 75, as best seen in FIG. 6 to receive the adjacent edge 76 of the bumper member 46 to provide a seamless transition therebetween. The second end 62 of casing 56 is provided with a slope to match the slope of its well portion 50. The first end 60 is detachably secured to rearward end 44 by suitable fastening means, such as bolts 78. Bolts 78 are received through holes 80 in the rearward end 44 that are screw threadably received into threaded apertures 82 provided in the first end 60 of the casing 56. The second end 62 is similarly detachable secured to the well portion 50 by suitable fastening means, such as bolts 84, that are received through holes 86 in the well portion 50 and screw threadably received into threaded apertures 88 provided in the second end 62.

The bumper casings 56,58 are also each provided with suitable opening 90 for receiving a brake and tail light fixture 92 therein.

The advantage of detachably securing the bumper corners 32,34 to their respective frame members is to permit their easy removal so as to provide ready access to their respective ends of the engine 30 and to other components located in the respective corners of the engine compartment 28 for servicing or other needs.

INDUSTRIAL APPLICABILILTY

The rear engine end frame 14 for a compact wheel loader 10 with its engine compartment 28 and bumper corners 32,34 constructed in accordance with the present invention affords numerous advantages to such compact wheel loader 10. The engine compartment has few individual components and is easy and inexpensive to fabricate. Many components are adapted to serve dual functions. For instance, the well portions 50,52 serve as structural members for the engine compartment 28, as well as fender extensions and as part of the wheel well enclosures for the rear wheels 22.

Of particular significance is the multi-functions provided by the bumper corners 32,34. Each bumper corner 32,34 not only serves as a wraparound bumper for protecting the loader 10, each serves as a cover for closing the open corner 54 of the engine compartment 28. More importantly, each bumper corner is of a sufficiently heavy weight to function as a counterweight for providing the loader 10 with the correct weight distribution when digging or lifting materials with the bucket located on the front frame of the loader. As a consequence, separate counterweights need not be added to the loader 10 for this function, thereby eliminating the extra cost for such counterweights. In addition, the bumper corners 32,34 are readily removable in order to provide access to those components located in the corners of the engine compartment 28, making servicing, repair or replacement of such components easier and less time consuming.

Other aspects and advantages of the present invention of this invention can be obtained through a study of the drawings, the disclosure and the appended claims.

We claim:

1. A bumper corner for a rear engine end frame of a compact wheel loader, comprising:

a rounded contoured heavy casing, said casing being constructed of a cast metal of generally uniform thickness and having an inward facing first end and a forward facing second end disposed outward and forward of said first end, said casing extending between said first and second ends and having an inwardly extending upper ledge portion, an upper side portion extending downwardly from said upper ledge portion, a lower side portion sloping inwardly from said upper side portion and a lower ledge portion extending inwardly from said lower side portion, each of said portions extending laterally from said first end along a first curved path of a large radius then transitioning toward the front along a second curved path of a much smaller radius to a third curved path of another large radius to said second end.

2. The bumper corner of claim 1 wherein said engine end frame includes an engine compartment portion, said engine compartment portion having a generally upright, longitudinally extending frame member and a forward rear wheel well portion, said frame member having a rearward end and said wheel well portion extending laterally outwardly from said frame member at a position forward of said rearward end so as to define an open corner therebetween, and wherein said first end of said bumper casing is positionable against said end of said frame member and said second end thereof is positionable against said wheel well portion so as to close said open corner.

3. The bumper corner of claim 1 wherein said upper side portion includes an opening therethrough generally along said first curved path, said opening being adapted to receive a rear tail light therein.

4. The bumper corner of claim 1 wherein said casing has a mass of at least 100 kilograms.

5. A bumper corner for a rear engine end frame of an articulated compact wheel loader, said frame extending along a longitudinal axis from a rearward end to a forward end and being supported by a pair of laterally spaced wheels disposed on a respective one of opposite lateral sides of said frame, said bumper corner comprising:

a heavy cast metal casing adapted to wraparound a rear corner of said engine end frame, said casing having generally uniform thickness and having a first end at the rearward end of said frame facing toward said longitudinal axis thereof and a second end positionable along one of said lateral sides of the frame located behind and facing in a direction forward toward one of said wheels, said casing extending between said first and second ends and having an inwardly extending upper ledge portion, an upper side portion extending downwardly from said upper ledge portion, an angled lower side portion sloping inwardly from said upper side portion and a lower ledge portion extending inwardly from said lower side portion, each of said portions extending laterally from said first end along a first curved path of a large radius then transitioning toward the forward end of the frame along a second curved path of a much smaller radius to a third curved path of another large radius to said second end.

6. A rear engine end frame for an articulated wheel loader, said end frame extending along a longitudinal axis and being supported by a pair of laterally spaced wheels disposed on a respective one of opposite lateral sides of said frame ahead of a rearward end of said frame, said rear engine end frame comprising:

an engine compartment portion at the rearward end of said end frame behind said wheels, said engine compartment portion having a pair of laterally spaced, generally upright longitudinally extending frame members each having a forward end and a rearward end, a bumper member connected to and extending laterally between the rearward ends of said longitudinally extending frame members and a laterally extending frame member connected to and extending between the forward ends of each of said longitudinally extending frame members, said laterally extending frame member having a pair of forwardly sloping rear wheel well portions, each extending laterally outwardly behind a respective one of said pair of wheels at a position forward of said rearward end so as to define an open corner between each of said wheel well portions and a respective one of said longitudinally extending frame members; and a pair of bumper corners adapted to close a respective one of said open corners, each of said bumper corners being constructed from a metal casting of sufficient thickness to provide each such corner bumper with a mass in excess of about 100 kilograms.

7. The rear engine end frame of claim 6 wherein said bumper corners are each made of a heavy cast metal casing adapted to wraparound a respective one of said open corners of said engine end frame, said casing having generally uniform thickness and having a first end at the rearward end of said frame facing toward said longitudinal axis thereof and a second end along one of said lateral sides of the frame located behind and facing forward toward one of said wheels, said casing extending between said first and second ends and having an inwardly extending upper ledge portion, an upper side portion extending downwardly from said upper ledge portion, an angled lower side portion sloping inwardly from said upper side portion and a lower ledge portion extending inwardly from said lower side portion, each of said portions extending laterally from said first end along a first curved path of a large radius then transitioning toward the forward end of the frame along a second curved path of a much smaller radius to a third curved path of another large radius to said second end.

8. The bumper corner of claim 7 wherein an engine is transversely mounted in said engine compartment portion and wherein each of said first and second ends of said bumper casing are detachably mounted to a respective one of said frame member and wheel well portion to provide service access to the adjacent end of the engine.

* * * * *